(12) United States Patent
Schwetlick

(10) Patent No.: US 7,014,678 B2
(45) Date of Patent: Mar. 21, 2006

(54) USE OF OIL-CHARGED MILL-SCALE IN SHAFT FURNACES AND CONVERTERS AFTER CHEMICAL BINDING AND PELLETING THEREOF

(76) Inventor: Wolfgang Schwetlick, Oberallmendstrasse 20A, CH-6300 Zug (CH)

( * ) Notice: Subject to any disclaimer, the term of this patent is extended or adjusted under 35 U.S.C. 154(b) by 103 days.

(21) Appl. No.: 10/357,257

(22) Filed: Feb. 3, 2003

(65) Prior Publication Data

US 2003/0172777 A1    Sep. 18, 2003

Related U.S. Application Data

(63) Continuation-in-part of application No. PCT/EP01/08984, filed on Aug. 2, 2001.

(30) Foreign Application Priority Data

Aug. 3, 2000    (DE)    ............................... 100 38 566

(51) Int. Cl.
*C21B 11/00*    (2006.01)

(52) U.S. Cl. ......................................... 75/433; 75/962

(58) Field of Classification Search .................. 75/433, 75/962

See application file for complete search history.

(56) References Cited

U.S. PATENT DOCUMENTS

| 4,585,475 A | * | 4/1986 | Fosnacht ..................... 75/544 |
| 5,186,742 A | | 2/1993 | Hoffman et al. |
| 5,885,328 A | * | 3/1999 | Markarian et al. ............ 75/770 |

* cited by examiner

*Primary Examiner*—Melvyn Andrews
(74) *Attorney, Agent, or Firm*—Nils H. Ljungman & Associates

(57) ABSTRACT

According to the invention, oil-charged mill-scale is treated such that the oil is encapsulated or bound therein. An escape of oil on use in a shaft oven first occurs when the ignition point is reached, thus guaranteeing combustion. Agglomeration of said mixture is by pelleting. A mixture comprising the following is preferably used for encapsulation and chemical binding of the oil: A zinc salt and a calcium salt of a saturated or unsaturated fatty acid, a hydrophobic inducing agent, an amino alcohol and ammonia. The abstract of the disclosure is submitted herewith as required by 37 C.F.R. §1.72(b). As stated in 37 C.F.R. §1.72(b), "A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims." Therefore, the abstract is not intended to limit the claims in any manner and should not be interpreted as limiting the claims in any manner.

20 Claims, No Drawings

USE OF OIL-CHARGED MILL-SCALE IN SHAFT FURNACES AND CONVERTERS AFTER CHEMICAL BINDING AND PELLETING THEREOF

CONTINUING APPLICATION DATA

This application is a Continuation-In-Part application of International Patent Application No. PCT/EP01/08984, filed on Aug. 2, 2001, which claims priority from Federal Republic of Germany Patent Application No. 100 38 566.4, filed on Aug. 3, 2000. International Patent Application No. PCT/EP01/08984 was pending as of the filing date of this application. The United States was an elected state in International Patent Application No. PCT/EP01/08984.

BACKGROUND OF THE INVENTION

1. Field of the Invention

This invention relates to the use of oil-charged mill-scale. Scaling in this case is defined as the formation of oxides that occurs on the surface of metals in the solid state as a consequence of a thermal effect in an oxidizing atmosphere.

2. Background Information

On ferrous materials, oxidation begins above approximately 400 degrees Celsius. The oxidation becomes particularly severe at temperatures above 600 degrees Celsius, so that the scaling limit for industrial iron is frequently defined as 650 degrees Celsius. The mill scale is formed during the rolling of the steel, and occurs during both hot rolling and cold rolling.

Depending on the rolling process, water and oil occur along with the mill scale.

Mill scale from the production of sheet steel products contains water (<40%) and oil. These components are currently expelled in an energy-intensive process by heat treatment before the scale can be used in a shaft furnace or in converters to recover the iron it contains.

Shaft furnaces include blast furnaces and cupola furnaces. All shaft furnaces are characterized by a vertical tubular shaft.

Shaft furnaces are used for the production of pig iron by the reduction of oxide iron ore with coke. The shaft furnace is charged at its upper end with iron ore, coke and additives. This charge is called the burden. A hot blast or heated air is blown laterally into the lower portion of the furnace. The molten iron and slag that are formed flow downward along the shaft furnace.

In the uppermost portion of the furnace, the burden is first dried. During this process, hydroxide iron ore is converted to oxide iron ore. The heat of the ore increases as it travels down the shaft. The reduction of the ore begins in the temperature range of 400 degrees Celsius.

The use of mill scale in the burden provides an opportunity for the economically beneficial recycling and disposal of the mill scale. The mill scale thereby reacts like the ore.

The prior art is described in DE 4101584 A1, DE 4329630 A1 and DE 3632364 C2, among other publications.

Oil-charged mill scale would make an additional advantageous contribution to the energy balance in the shaft furnace, but the use of oil is not without problems. Compounds that pollute the environment are easily formed. Some of these compounds are already contained in the oil.

The oil components are expelled by the heat treatment of the mill scale prior to the use of the mill scale. It is thereby advantageous to burn the gases that are discharged. An appropriate booster flame is provided regularly to ensure combustion even under unfavorable conditions.

The heat treatment is simultaneously used to achieve an agglomeration of the mill scale by sintering. This treatment results in the formation of large particles that are added to the burden but do not fall through between the other components of the burden.

Converters are vessels to handle molten metals and are lined with refractories, e.g. for the conversion with air by means of air or oxygen blown up or through the molten metal, in particular for the production of steel. The best-known converters are the Bessemer converter, the Thomas converter, the LD converter and the Siemens-Martin furnace, each of which is named after the corresponding process.

In the Bessemer process, steel is produced from high-silicon pig iron in an acid lined converter. The conversion takes place in the upright converter by a hot blast which is fed in through tuyeres on the floor of the converter. The Bessemer converter is tipped into a horizontal position to add the liquid pig iron and to empty the liquid steel produced. On account of the acid lining of the converter, the removal of sulfur and phosphorus is difficult.

The Thomas process is a basic blast method for the production of steel. A converter similar to the Bessemer converter is used, although in this case it is lined with a basic lining, i.e. with dolomite refractory bricks. The basic lining makes it possible to manufacture high-grade steel from high-phosphorus pig iron.

Just as in the Bessemer process, the hot blast for the conversion is blown into the upright converter through the tuyeres that are located in the base of the converter. The carbon in the pig iron is thereby oxidized. Then the phosphorus is oxidized and is absorbed by the slag. On account of the decarburization that occurs, a recarburization takes place after the conversion, for which purpose ferro alloys are used.

In the LD process, the conversion agent is pure oxygen which is blown onto the surface of the bath by means of a lance. This process can be used to convert practically all pig irons.

In the Siemens-Martin process, steel is produced according to the open hearth process in the Siemens-Martin furnace. As a result of the preheating of the combustion air in the Siemens-Martin furnace, and optionally the preheating of the fuel gas, high furnace temperatures of 1700 degrees Celsius, for example, can be reached. The high temperature then makes additional treatments possible during the conversion.

The converters also make it possible to use scrap and theoretically mill scale, too. The advantages of the use of mill-scale are to some extent offset by the oil the mill scale contains and the potential environmental pollution it causes.

OBJECT OF THE INVENTION

An additional object of the invention is to prevent environmental pollution by the oil in the mill scale. The invention thereby takes an approach which is different from that of the prior art. The invention teaches that the mill scale is encapsulated/bound so that the oil is released only after it has reached or significantly exceeded its ignition temperature. The oil then burns immediately after it has been released.

SUMMARY OF THE INVENTION AND DESCRIPTION OF THE PREFERRED EMBODIMENT

Specifically, the invention teaches that this object is accomplished with the features of the invention disclosed hereinbelow.

For the encapsulation and binding, a mixture is used which consists of:

A) at least one zinc salt of a saturated or unsaturated aliphatic or aromatic carboxylic acid
B) at least one calcium salt of a saturated or unsaturated aliphatic or aromatic carboxylic acid
C) at least one water-repellent agent
D) at least one amino alcohol
E) $NH_3$ Preferably the component (A) is a zinc salt of a saturated or unsaturated fatty acid, in particular of a saturated or unsaturated fatty acid with 1 to 30 carbon atoms, such- as palmitoleic acid, oleic acid, erucic acid, palmitic acid, margaric acid, stearic acid, arachic acid or behenic acid or mixtures of said acids.

The component (A) can also contain a plurality of zinc salts. Preferably at least one of the zinc salts has an active content of at least 15%, in particular 17%. The active content of zinc salt indicates to stoichiometric quantity of the zinc salt in aqueous solution.

The component (B) is at least one calcium salt of a saturated or unsaturated aliphatic or aromatic carboxylic acid. Component (B) is preferably at least one calcium salt of a saturated or unsaturated fatty acid. The definition of the fatty acid is as described above for component (A).

Component (C) is at least one water-repellent agent. The prior art described water-repellent agents for plaster and concrete. These agents can be used, for example, to make construction materials that contain lime and/or cement water-repellent. Water-repellent agents can react with the basic components of binders as indicated in the following equation:

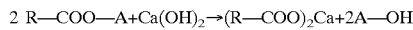

$$2\ R\text{---}COO\text{---}A + Ca(OH)_2 \rightarrow (R\text{---}COO)_2Ca + 2A\text{---}OH$$

whereby the R—COO— group is the saturated or unsaturated aliphatic or aromatic carboxylic acid group and the group A is an amino group. The saturated or unsaturated aliphatic aromatic carboxylic acid group is preferably a fatty acid group. The definition of the fatty acid is as described above for component (A). One example of a commercially available water-repellent agent is a reactive water-repellent agent sold under the trade name "LIGA MS" by Peter Greven Fett-Chemie GmbH & Co. KG. A further example of water-repellent agents are invert soaps, and alkyl ammonium salts, whereby the alkyl groups can be saturated or unsaturated and preferably have 1 to 30 carbon atoms. Component (C) can optionally be added in an alcohol/water mixture.

Component (D) is at least one amino alcohol. Preferably component (D) is selected from the group consisting of mono-, di- or triethanolamine, dimethylaminoethanol, N-methyldiethanolamine, mono-, di- and triisopropanolamine, in particular triethanolamine.

The mixture also includes $NH_3$ as component (E).

Preferably, the mixture contains 50 to 90 wt. %, in particular 70 to 80 wt. % of component (A). If component (A) comprises two zinc salts, there can be 60 to 70 wt. %, in particular 65 to 68 wt. % of a first zinc salt and 5 to 15 wt. %, in particular 8 to 10 wt. % of a second zinc salt with an active content of at least 15%, and in particular at least 17%. The mixture also contains preferably 0.1–10 wt. %, in particular 2 to 5 wt. % of component (B), 5 to 20 wt. %, in particular 12 to 15 wt. % of component (C) and 0.1 to 0.7 wt. % of component (E).

The mixture can be diluted with a solvent. In that case, it is advantageous to maintain a concentration of the mixture from 0.1 to 0.25 in a dilution of 1:3 to 1:6. The solvent can be selected from the group that consists of water, an alcohol and mixtures thereof. The alcohol can be selected from the group that comprises ethanol, isopropyl alcohol and butyl alcohol. The solvent is preferably a mixture of water and alcohol, which preferably consists of 85 wt. % water and 15 wt. % alcohol. Preferably, 80 to 99 wt. % solvent, with reference to the weight of the total mixture, and in particular 90 to 98 wt. % of solvent are added.

In the mixture taught by the invention, there are always pozzolanic binding agents such as Portland cement or pozzolanic active agents such as selected fly ash, to achieve the required strength values. Such pozzolanic waste materials and binders can make up a proportion from 15 to 50 wt. % of the mixture of the components (A) to (E).

The mixture can also contain additional additives which are preferably selected from the group consisting of means for the precipitation of heavy metals such as sodium sulfide, reduction agents such as $FeSO_4$ and complexing agents such as mercaptan compounds.

Examples of additional additives that can be used include $FeCl_3$, $NaHSO_3$, urea and water glass.

Depending on the type and concentration of water and mineral hydrocarbons, additional mixing components in addition to binders can be added in the form of selected ash for the absorption of the water and reagents for the adsorption and complexing with the mineral hydrocarbons. Absorbing additives (e.g. bentonite) can be added, and pozzolanic reaction binding agents (cement and fly ash) can be added to absorb water.

The stoichiometric relationship between water content, mineral hydrocarbons and reagent requirements is determined on the basis of the concentration of the water and of the mineral hydrocarbons. The proportion of water and mineral hydrocarbon in the mixture can be 0.5 to 35 wt. %.

In the method taught by the invention, in a Step a) the mixture taught by the invention is added to the mill scale. Preferably 0.01 to 5 wt. %, more preferably 0.05 to 0.15 wt. % and in particular 0.12 wt. % of mixture, with reference to the weight of the mill scale, are added. Depending on the amount of the oil adhering to the mill scale, the mixture taught by the invention can be added undiluted or diluted with water. For an oil amount of <5000 mg/ton of mill scale, it is preferable to add the mixture taught by the invention diluted with water, whereby the ratio of the mixture taught by the invention to water is preferably 1:20 to 1:10. If the amount of oil is between >5000 mg/ton of mill scale and <50,000 mg/ton of mill scale, it is preferable to add the mixture taught by the invention diluted with water, whereby the ratio of the mixture taught by the invention to water is preferably 1:10 to 1:5. If the amount of oil is >50,000 mg/ton of mill scale, it is preferable to add the mixture taught by the invention diluted with water, whereby the ratio of the mixture taught by the invention to water is preferably 1:5 to 1:2.5.

After the addition of the mixture taught by the invention and optional additives, the components are mixed in a Step b). The mixing can be performed in standard mixing equipment or modified mixers.

During the mixing, it is advantageous if the amount of energy introduced, i.e. mixing at a high speed, the mixing time, the mixing sequence and the control of the reaction temperature, can be varied. As a result of the higher amount of energy introduced, an improved homogenization of the compound is achieved. The amount of energy introduced is preferably at least approximately 5 Amperes, in particular up to 30 Amperes, and if necessary even 60 to 75 Amperes. The mixing time is preferably 3 to 5 minutes, although it can optionally also be 4 to 10 minutes. The reaction temperature is preferably at least 20 degrees Celsius, and even greater preference is given to a reaction temperature of at least 35 degrees Celsius. The formation of grains can also occur in 6 to 15 minutes, whereby a grain size of greater than 2 and less than 20 mm is achieved with a compression strength from 2 to 30 N per square millimeter. Binders and other pozzolanic additives have an influence on this process. In the exemplary embodiment, the proportion is 2 to 12 wt. % of the mixture. In the exemplary embodiment, the proportion of the reagents in the mixture is 0.5 to 5 wt. %, and the proportion of absorption agents is 5 to 15 wt. %.

The mixture taught by the invention can also be used advantageously to treat thixotropic materials.

The mixture taught by the invention and the optional additional additives can either be added to the mill scale simultaneously or in batches. The mixture and the additives can be added in batches in sequence to control the progress of the reaction. The objective is a defined intermediate product. If the mixture taught by the invention is added in several batches during the mixing, the temperature and the individual addition stages. If a conversion of the oil is desired, the conversion can be controlled on the basis of measurements.

The treated mill scale can be reacted with a hydraulic binding agent in a Step c). The hydraulic binder can be selected from the group consisting of cement, alumina and Portland cement.

The mixture taught by the invention makes possible not only an encapsulation of the oil but also its chemical binding and a modification of the physical characteristics of the mill scale slurry. Everything contributes to the delayed release of the oil in the shaft furnace. The moisture is absorbed and/or the density of the material is increased. The compression is achieved by means of pelleting. The particle size achieved by pelleting is 2 to 30 mm, preferably 15 mm. The pelleting increases the compression strength and reduces the permeability. The surface of the pellets is solidified and the diffusion of the mineral hydrocarbons they enclose is significantly reduced. Preferably, a compression strength of at least 15 N/mm$^2$ is achieved.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

One feature of an embodiment of the invention resides broadly in the use of mill scale slurry from mill scale, oil or similar mineral hydrocarbons and water, whereby additives and absorbers are added, a) whereby the additives include water-repellent agents and/or calcium compounds and/or alcohols, b) whereby an encapsulation and binding of the oil on the mill scale takes place so that when the mill scale is subsequently charged into a shaft furnace or converter, the oil is released only in a temperature zone which is at the ignition point or above the ignition point of the gas being discharged and is immediately combusted, whereby c) an absorbent is used for the mineral hydrocarbons or for water which is selected from the group of zinc salts or calcium salts of a carboxylic acid and whereby a hydraulic binder is added, aa) which is selected from the group comprising cement, alumina, Portland cement, burnt lime or fly ash, bb) whereby the proportion of the hydraulic binder is 2 to 30 wt. % with reference to the weight of the mill scale, and whereby it is added in a quantity that corresponds to the mineral hydrocarbon content and the water content and the mixture is homogenized, d) whereby the water content is 0.5 to 35 wt. %, with reference to the total weight of the mill scale slurry, e) whereby during the mixing, the mixture is heated so that the water evaporates to the proportion required for pelleting and f) the parts are agglomerated and pelletized after the mixing and g) the agglomerate is recycled into the iron and steel production operation, where a combustion of the components containing carbon takes place.

Another feature of an embodiment of the invention resides broadly in the use of mill scale slurry from mill scale, characterized by the use of an absorbent for the encapsulation and binding, consisting of A) at least one zinc salt of a saturated or unsaturated aliphatic or aromatic carboxylic acid, in a proportion of 50 to 90 wt. % with reference to the total weight of the absorbent and/or B) at least one calcium salt of a saturated or unsaturated aliphatic or aromatic carboxylic acid, in a proportion of 0.1 to 20 wt. % with reference to the total weight of the absorbent and/or C) at least one water-repellent agent in a proportion of 0.1 to 10 wt. % with reference to the total weight of the absorbent and/or D) at least one amino alcohol in a proportion of 0.01 to 5 wt. % with reference to the total weight of the absorbent and/or E) NH$_3$ in a proportion of 0.01 to 5 wt. % with reference to the total weight of the absorbent.

Yet another feature of an embodiment of the invention resides broadly in the use of mill scale slurry from mill scale, characterized by the fact that the component (A) is a zinc salt or a saturated or unsaturated fatty acid and/or the component (B) is a calcium salt of a saturated or unsaturated fatty acid and/or the component (C) is an invert soap.

Still another feature of an embodiment of the invention resides broadly in the use of mill scale slurry from mill scale, characterized by the fact that the fatty acid has 1 to 30 carbon atoms.

A further feature of an embodiment of the invention resides broadly in the use of mill scale slurry from mill scale, characterized by the fact that the fatty acid is a palmitoleic acid, oleic acid, erucic acid, palmitic acid, margaric acid, stearic acid, arachic acid, behenic acid or a mixture thereof.

Another feature of an embodiment of the invention resides broadly in the use of mill scale slurry from mill scale, characterized by the fact that the component D) is selected from the group consisting of mono-, di- or triethanolamine, dimethylaminoethanol, N-methyldiethanolamine, mono-, di- and triisopropanolamine.

Still another feature of an embodiment of the invention resides broadly in the use of mill scale slurry from mill scale, characterized by the fact that the absorbent is added to the mixture in water or solvent in a dilution of 0.1 to 0.33, whereby for 1 part water or solvent there are 0.1 to 0.33 parts absorbent.

Still another feature of an embodiment of the invention resides broadly in the use of mill scale slurry from mill scale, characterized by the fact that the ratio of the weight of the mixture of water and solvent to mill scale is 0.01 to 5, in particular 0.05 to 0.15.

A further feature of an embodiment of the invention resides broadly in the use of mill scale slurry from mill scale, characterized by the fact that the solvent is an alcohol and selected from a group consisting of ethanol, isopropyl alcohol and butyl alcohol.

Another feature of an embodiment of the invention resides broadly in the use of mill scale slurry from mill scale, characterized by 80 to 99 wt. % solvent in the mixture with water, in particular 90 to 98 wt. % solvent in the mixture with water.

Yet another feature of an embodiment of the invention resides broadly in the use of mill scale slurry from mill scale, characterized by the fact that the ratio of the weight of water to the mixture of solvent and water is as follows

| mg oil/ton of mill scale | ratio of water to mixture |
|---|---|
| <5000 | 1:20 to 1:10 |
| >5000 and <50,000 | 1:10 to 1:5 |
| >50,000 | 1:5 to 1:2.5 |

Still another feature of an embodiment of the invention resides broadly in the use of mill scale slurry from mill scale, characterized by the fact that the mixture contains precipitants and/or reducing agents and/or complexing agents, binders or pozzolanic active agents.

A further feature of an embodiment of the invention resides broadly in the use of mill scale slurry from mill scale, characterized by the fact that the binder is a hydraulic binder.

Another feature of an embodiment of the invention resides broadly in the use of mill scale slurry from mill scale, characterized by the fact a) that the hydraulic binder is selected from the group cement, alumina, Portland cement, burnt lime or fly ash and b) that the proportion of the hydraulic binder is 2 to 30 wt. %, with reference to the weight of the mill scale.

Yet another feature of an embodiment of the invention resides broadly in the use of mill scale slurry from mill scale, characterized by the fact that the mixture contains precipitants and/or reduction agents and/or complexing agents, binders or pozzolanic active agents.

Still another feature of an embodiment of the invention resides broadly in the use of mill scale slurry from mill scale, characterized by the use of fly ash containing CaO with a proportion of 0.45 to 0.7 wt. % of water.

A further feature of an embodiment of the invention resides broadly in the use of mill scale slurry from mill scale, characterized by the use of cement with a proportion of 0.27 to 0.46 wt. % with reference to the water.

Another feature of an embodiment of the invention resides broadly in the use of mill scale slurry from mill scale, characterized by the fact that the mill scale and the mixture [are added] simultaneously or sequentially, continuously or in batches, [at a temperature of] at least 20 degrees Celsius, in particular at least 35 degrees Celsius, and the mixing time is at least 3.5 minutes, in particular 4 to 10 minutes.

Yet another feature of an embodiment of the invention resides broadly in the use of mill scale slurry from mill scale, characterized by the fact that the pellets have a diameter of 2 to 30 mm, preferably 15 mm, a compression strength of at least 15 and preferably 20 to 30 N per square millimeter.

The abstract of the disclosure is submitted herewith as required by 37 C.F.R. §1.72(b). As stated in 37 C.F.R. §1.72(b), A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, the abstract is not intended to limit the claims in any manner and should not be interpreted as limiting the claims in any manner.

Some examples of the Bessemer Process or Bessemer Converter that may possibly be utilized or adapted for use in at least one possible embodiment of the present invention may possibly be found in the following U.S. Pat. No. 6,070,733, Entitled "Treatment of waste material;" U.S. Pat. No. 3,930,843, Entitled "Method for increasing metallic yield in bottom blown processes;" U.S. Pat. No. 3,938,790, Entitled "Method and converter for refining pig-iron into steel;" U.S. Pat. No. 3,932,172, Entitled "Method and converter for refining pig-iron into steel;" and U.S. Pat. No. 4,040,608, Entitled "Method for the recovery of gases coming from refining furnaces".

Some examples of the LD Converter that may possibly be utilized or adapted for use in at least one possible embodiment of the present invention may possibly be found in the following U.S. Pat. No. 6,284,038, Entitled "Process for the conversion of iron bearing residues into a synthetic rock;" U.S. Pat. No. 5,944,870, Entitled "Method of manufacturing pig iron or steel and cement clinker from slags;" U.S. Pat. No. 5,516,357, Entitled "Process for producing cement from metallurgical slag;" U.S. Pat. No. 4,906,530, Entitled "Grain oriented electromagnetic steel sheets having a very low iron loss;" U.S. Pat. No. 4,652,308, Entitled "Process for refining molten steel;" and U.S. Pat. No. 4,555,265, Entitled "Method of treating steel with calcium, to obtain a steel well adapted to cold forming, with a low silicon content".

The components disclosed in the various publications, disclosed or incorporated by reference herein, may possibly be used in the embodiments of the present invention, as well as equivalents thereof.

Some examples of the Thomas Process or Thomas Converter which may possibly be utilized or adapted for use in at least one possible embodiment of the present invention may possibly be found in the following U.S. Pat. No. 5,451,523, Entitled "Apparatus for composting organic waste material" and U.S. Pat. No. 4,352,764, Entitled "Method of making slag and slag wool".

The appended drawings in their entirety, including all dimensions, proportions and/or shapes in at least one embodiment of the invention, are accurate and are hereby included by reference into this specification.

Some examples of the Siemens-Martin Process which may possibly be utilized or adapted for use in at, least one possible embodiment of the present invention may possibly be found in the following U.S. Pat. No. 5,045,279, Entitled "Corrosion-resistant carbon steel with good drawability characteristics;" and U.S. Pat. No. 5,255,900, Entitled "Method and device for processing hot, liquid slags".

An example of Palmitoleic Acid that may possibly be utilized or adapted for use in at least one possible embodiment of the present invention may possibly be found in U.S. Pat. No. 6,461,662, Entitled "Palmitoleic acid and its use in foods".

All, or substantially all, of the components and methods of the various embodiments may be used with at least one embodiment or all of the embodiments, if more than one embodiment is described herein.

Some examples of Oleic Acid which may possibly be utilized or adapted for use in at least one possible embodiment of the present invention may possibly be found in the following U.S. Pat. No. 6,361,711, Entitled "Flame retardant hydraulic oil containing a synthetic ester formed by reaction of a polyol and a mixture of carboxylic acids including oleic acid and isostearic acid;" U.S. Pat. No. 6,312,623, Entitled "High oleic acid oil compositions and methods of making and electrical insulation fluids and devices comprising the same;" U.S. Pat. No. 5,997,953, Entitled "Oleic acid as an additive for a protective coating;" U.S. Pat. No. 5,949,017, Entitled "Electrical transformers containing electrical insulation fluids comprising high oleic acid oil compositions;" U.S. Pat. No. 4,983,396, Entitled "Percutaneous penetration enhancer of oleic acid and 2-ethyl-1,3-hexanediol;" and U.S. Pat. No. 4,176,127, Entitled "Process for the production of silanes from oleic acid esters".

Some examples of Erucic Acid which may possibly be utilized or adapted for use in at least one possible embodiment of the present invention may possibly be found in the following U.S. Pat. No. 5,773,073, Entitled "Water-in-oil emulsion containing a polyglycerol fatty acid ester having erucic acid as the main fatty acid component;" and U.S. Pat. No. 5,633,151, Entitled "Enzymatic process for the isolation of erucic acid from vegetable oils".

All of the patents, patent applications and publications recited herein, and in the Declaration attached hereto, are hereby incorporated by reference as if set forth in their entirety herein.

Some examples of Palmitic Acid which may possibly be utilized or adapted for use in at least one possible embodiment of the present invention may possibly be found in the following U.S. Pat. No. 3,966,952, Entitled "Alpha-isomer of the palmitic acid ester of 10-[3-(4-hydroxy-ethyl-1-piperazinyl)propylidene]-2-trifluoromethyl thiaxanthene, compositions thereof and a method of preparation thereof and use thereof;" U.S. Pat. No. 5,872,271, Entitled "Endogenous vegetable oil derived from helianthus annuus seeds wherein the levels of palmitic acid and oleic acid are provided in an atypical combination;" U.S. Pat. No. 6,060,647, Entitled "Elevated palmitic acid production in soybeans;" and U.S. Pat. No. 5,602,311, Entitled "Soybeans and soybeans products having high palmitic acid content".

Some examples of Stearic Acid which may possibly be utilized or adapted for use in at least one possible embodiment of the present invention may possibly be found in the following U.S. Pat. No. 5,993,861, Entitled "12-hydroxy stearic acid esters, compositions based upon same and methods of using and making such compositions;" U.S. Pat. No. 4,758,276, Entitled "Stearic acid-containing ink jet inks;" U.S. Pat. No. 4,440,574, Entitled "Nonsludging complexes of chromium and stearic acid;" U.S. Pat. No. 5,795,969, Entitled "Soybean vegetable oil having elevated concentrations of both palmitic acid and stearic acid;" U.S. Pat. No. 6,486,336, Entitled "Sunflower seeds and oil having a high stearic acid content;" and U.S. Pat. No. 6,022,577, Entitled "High stearic acid soybean oil blends".

All of the patents, patent applications or patent publications, which were cited in the International Search Report, dated Feb. 26, 2002, and/or cited elsewhere are hereby incorporated by reference as if set forth in their entirety herein as follows: Federal Republic of Germany Patent Publication No. 44 32 721 A, having a publication date of Mar. 21, 1996, and having inventor Hans Ruf; French Patent Publication No. 2 760 664 A, having a publication date of Sep. 18, 1998, and having inventors Jean Alabert, Jean Musso, and Alain Charles; and U.S. Pat. No. 5,186,742, having a publication date of Feb. 16, 1993, and having inventors David C. Hofman and Norman L. Hains.

Some examples of Behenic Acid which may possibly be utilized or adapted for use in at least one embodiment of the present invention may possibly be found in the following U.S. Pat. No. 5,998,354, Entitled "Flowable, aqueous pearly luster dispersion containing behenic acid as pearlescent component and lauryl ether sulfate as dispersant;" U.S. Pat. No. 4,602,057, Entitled "Copolyamide adhesive containing behenic acid;" and U.S. Pat. No. 4,153,694, Entitled "Behenic acid esters, compositions thereof and a method of preparation thereof".

Some examples of Zinc salts which may possibly be utilized or adapted for use in at least one possible embodiment of the present invention include Zinc Carbonate; Zinc Stearate; Zinc Sulphate I.P./B.P./U.S.P.; Zinc Chloride I.P./B.P./U.S.P.; and Zinc Octate.

The corresponding foreign and international patent publication application, namely, Federal Republic of Germany Patent Application No. 100 38 566.4, filed on Aug. 3, 2000, having inventor Wolfgang SCHWETLICK, and International Application No. PCT/EP01/08984, filed on Aug. 2, 2001, having inventor Wolfgang SCHWETLICK, as well as its published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

An example of Saturated Aliphatic Carboxylic Acid which may possibly be utilized or adapted for use in at least one possible embodiment of the present invention may possibly be found in U.S. Pat. No. 6,291,712, Entitled "Process for producing saturated aliphatic carboxylic acid amide".

Some examples of Unsaturated Aliphatic Carboxylic Acid which may possibly be utilized or adapted for use in at least one possible embodiment of the present invention may possibly be found in the following U.S. Pat. No. 4,781,868, Entitled "Method for making unsaturated aliphatic carboxylic acid anhydrides;" U.S. Pat. No. 4,609,492, Entitled "Perfume composition containing an unsaturated aliphatic carboxylic acid;" U.S. Pat. No. 4,217,289, Entitled "Process for purification of the alkali metal salt of sulfonated unsaturated aliphatic carboxylic acid;" and U.S. Pat. No. 4,069,193, Entitled "Moulding compositions including unsaturated polyesters and an amide of an unsaturated aliphatic carboxylic acid".

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of Saturated or Unsaturated Aromatic Carboxylic Acids which may possibly be utilized or adapted for use in at least one possible embodiment of the present invention may possibly be found in the following U.S. Pat. No. 6,506,931, Entitled "Process for producing aromatic carboxylic acid;" U.S. Pat. No. 6,482,978, Entitled "Production method of aromatic carboxylic acid derivative;" U.S. Pat. No. 6,441,233, Entitled "Process for the preparation of aromatic carboxylic acid amides;" U.S. Pat. No. 6,395,680, Entitled "Composition of aromatic carboxylic acid compounds and thermosensitive recording material using the same;" and U.S. Pat. No. 6,143,925, Entitled "Process for producing aromatic carboxylic acid".

Some examples of pelleting which may possibly be utilized or adapted for use in at least one possible embodiment of the present invention may possibly be found in the following U.S. Pat. No. 5,071,336, Entitled "Rotary pelleting machine;" U.S. Pat. No. 5,792,485, Entitled "Pelleting press;" U.S. Pat. No. 4,674,198, Entitled "Apparatus for granulating, pelleting, and coating and/or drying fluid materials;" U.S. Pat. No. 4,659,299, Entitled "Mash pelleting apparatus;" U.S. Pat. No. 4,327,050, Entitled "Extrusion and pelleting apparatus and method;" and U.S. Pat. No. 4,293,295, Entitled "Pelleting press".

The details in the patents, patent applications and publications may be considered to be incorporable, at applicant's option, into the claims during prosecution as further limitations in the claims to patentably distinguish any amended claims from any applied prior art.

Some examples of aliphatic carboxylic acids which may possibly be utilized or adapted for use in at least one possible embodiment of the present invention include acetic acid, propionic acid, iso-butyric acid, caproic acid, lactic acid, maleic acid, pyruvic acid, oxalic acid, succinic acid, and tartaric acid.

Some examples of aromatic carboxylic acids which may possibly be utilized or adapted for use in at least one possible embodiment of the present invention include phthalic acid, salicylic acid, benzoic acid, and acetyl salicylic acid.

The invention as described hereinabove in the context of the preferred embodiments is not to be taken as limited to all of the provided details thereof, since modifications and variations thereof may be made without departing from the spirit and scope of the invention.

Arachic Acid, which may also possibly be known as icosanoic acid, arachidic acid, arachic acid, and n-eicosanoic acid, may have a Molecular formula of $C_{20}H_{40}O_2$. Margaric Acid, a synthetic crystalline fatty acid, may have a Molecular formula of $C_{17}H_{34}O_2$.

The invention as described hereinabove in the context of the preferred embodiments is not to be taken as limited to all of the provided details thereof, since modifications and variations thereof may be made without departing from the spirit and scope of the invention.

What is claimed is:

1. A method of recycling mill scale from iron or steel to produce iron or steel, said method comprising the steps of:
    collecting mill scale from the production of iron or steel, said mill scale comprising mill scale, oil or similar mineral hydrocarbons, and water;
    adding a mixture of additives and absorbents to said mill scale to form a mill scale slurry, wherein the water content is 0.5 to 35 wt. % with reference to the total weight of the mill scale slurry, wherein said step of adding a mixture of additives and absorbents comprises:
        adding additives comprising at least one of: water-repellent agents, calcium compounds, and alcohols;
        adding an absorbent for absorbing said mineral hydrocarbons or for absorbing said water, which absorbent comprises: zinc salts or calcium salts of a carboxylic acid; and
        adding a hydraulic binder in a quantity that corresponds to the mineral hydrocarbon content and the water content and is in a proportion of 2 to 30 wt. % of the weight of the mill scale slurry, said hydraulic binder comprises: cement, alumina, Portland cement, burnt lime or fly ash;
    mixing said mill scale slurry;
    homogenizing said mill scale slurry;
    encapsulating and binding said oil, such that said oil is essentially only released at a temperature which is at or above an ignition point of a gas being discharged in a shaft furnace or converter to permit said oil to be essentially immediately combusted;
    heating said mill scale slurry during mixing to evaporate a proportion of the water to a proportion required for pelleting;
    agglomerating and pelletizing said mill scale slurry;
    recycling said agglomerated and pelletized mill scale slurry in an iron or steel production operation to permit combustion of components containing carbon; and
    producing iron or steel.

2. The method according to claim 1, wherein said mill scale slurry comprises an absorbent for the step of encapsulating and binding, comprising at least one of
    (A) at least one zinc salt of a saturated or unsaturated aliphatic or aromatic carboxylic acid, in a proportion of 50 to 90 wt. % with reference to the total weight of the absorbent;
    (B) at least one calcium salt of a saturated or unsaturated aliphatic or aromatic carboxylic acid, in a proportion of 0.1 to 20 wt. % with reference to the total weight of the absorbent;
    (C) at least one water-repellent agent in a proportion of 0.1 to 10 wt. % with reference to the total weight of the absorbent;
    (D) at least one amino alcohol in a proportion of 0.01 to 5 wt. % with reference to the total weight of the absorbent; and
    (E) $NH_3$ in a proportion of 0.01 to 5 wt. % with reference to the total weight of the absorbent.

3. The method according to claim 2, wherein the component (A) is a zinc salt or a saturated or unsaturated fatty acid and/or the component (B) is a calcium salt of a saturated or unsaturated fatty acid and/or the component (C) is an invert soap.

4. The method according to claim 3 wherein the fatty acid has 1 to 30 carbon atoms.

5. The method according to claim 4, wherein the fatty acid is a palmitoleic acid, oleic acid, erucic acid, palmitic acid, margaric acid, stearic acid, arachic acid, behenic acid or a mixture thereof.

6. The method according to claim 2, wherein the component D) is selected from a member of the group consisting of:
    monoethanolamine, diethanolamine, triethanolamine, dimethylaminoethanol, N-methyldiethanolamine, monoisopropanolamine, diisopropanolamine, and triisopropanolamine.

7. The method according to claim 2, wherein the absorbent is added in water or solvent in a dilution of 0.1 to 0.33, whereby for 1 part water or solvent there are 0.1 to 0.33 parts absorbent.

8. The method according to claim 2, wherein the ratio of the weight of water and solvent to mill scale is one of: 0.01 to 5 and 0.05 to 0.15.

9. The method according to claim 7, wherein the solvent is an alcohol and is selected from a member of the group consisting of ethanol, isopropyl alcohol and butyl alcohol.

10. The method according to claim 7, wherein the wt. % of solvent in the mixture with water is in the range of one of: 80 to 99 wt. % and 90 to 98 wt %.

11. The method according to claim 7, wherein the ratio of the weight of water to the mixture of solvent and water is as follows

| mg oil/ton of mill scale | ratio of water to mixture |
|---|---|
| <5000 | 1:20 to 1:10 |
| >5000 and <50,000 | 1:10 to 1:5 |
| >50,000 | 1:5 to 1:2.5. |

12. The method according to claim 2, wherein the mixture contains precipitants and/or reduction agents and/or complexing agents, binders or pozzolanic active agents.

13. The method according to claim 1, wherein the use of fly ash containing CaO with a proportion of 0.45 to 0.7 wt. % of water.

14. The method according to claim 13, wherein the use of cement with a proportion of 0.27 to 0.46 wt. % with reference to the water.

15. The method according to claim 2, wherein the mill scale and the mixture are added simultaneously or sequentially, continuously or in batches, at a temperature of one of: at least 20 degrees Celsius and at least 35 degrees Celsius, and the mixing time is one of: at least 3.5 minutes and 4 to 10 minutes.

16. The method according to claim 2, wherein the pellets have a diameter of one of: 2 to 30 mm and 15 mm, and have a compression strength of one of: at least 15 N per square millimeter and 20 to 30 N per square millimeter.

17. The method according to claim 3, wherein the component D) is selected from a member of the group consisting of:
monoethanolamine, diethanolamine, triethanolamine, dimethylaminoethanol, N-methyldiethanolamine, monoisopropanolamine, diisopropanolamine, and triisopropanolamine.

18. The method according to claim 3, wherein the absorbent is added to the mixture in water or solvent in a dilution of 0.1 to 0.33, whereby for 1 part water or solvent there are 0.1 to 0.33 parts absorbent.

19. The method according to claim 3, wherein the ratio of the weight of the mixture of water and solvent to mill scale is one of: 0.01 to 5 and 0.05 to 0.15.

20. The method according to claim 3, wherein the mixture contains precipitants and/or reduction agents and/or complexing agents, binders or pozzolanic active agents.

* * * * *